United States Patent

Nielsen et al.

Patent Number: 5,419,487
Date of Patent: May 30, 1995

[54] METHODS FOR THE SPRAY APPLICATION OF WATER-BORNE COATINGS WITH COMPRESSED FLUIDS

[75] Inventors: Kenneth A. Nielsen; David C. Busby, both of Charleston; Charles W. Glancy, South Charleston, all of W. Va.; Gregory C. Ross, Erkrath, Germany

[73] Assignee: Union Carbide Chemicals & Plastics Technology Corporation, Danbury, Conn.

[21] Appl. No.: 128,880

[22] Filed: Sep. 29, 1993

[51] Int. Cl.$^6$ .............................. B05D 1/02
[52] U.S. Cl. ........................................... 239/10
[58] Field of Search ............... 427/421; 239/1, 3, 8, 239/10, 597, 599

[56] References Cited

U.S. PATENT DOCUMENTS

| | | | |
|---|---|---|---|
| 4,582,731 | 4/1986 | Smith | 427/421 |
| 4,734,227 | 3/1988 | Smith | 264/13 |
| 4,734,451 | 3/1988 | Smith | 524/493 |
| 4,923,720 | 5/1990 | Lee et al. | 427/422 |
| 5,009,367 | 4/1991 | Nielsen | 239/3 |
| 5,027,742 | 7/1991 | Lee et al. | 118/300 |
| 5,057,342 | 10/1991 | Hoy et al. | 427/422 |
| 5,098,194 | 3/1992 | Kuo et al. | 366/144 |
| 5,106,650 | 4/1992 | Hoy et al. | 427/27 |
| 5,108,799 | 4/1992 | Hoy et al. | 427/422 |
| 5,141,156 | 8/1992 | Hoy et al. | 239/135 |
| 5,171,613 | 12/1992 | Bok et al. | 427/422 |
| 5,178,325 | 1/1993 | Nielsen | 239/1 |
| 5,211,342 | 5/1993 | Hoy et al. | 239/707 |
| 5,290,603 | 3/1994 | Nielsen et al. | 427/421 |

Primary Examiner—Andres Kashnikow
Assistant Examiner—Kevin P. Weldon
Attorney, Agent, or Firm—M. N. Reinisch

[57] ABSTRACT

The present invention is directed to methods for spraying water-borne coating compositions having at least about thirty five percent by weight of the solvent fraction by using compressed fluids such as carbon dioxide and ethane, so as to decrease runs, sags and drying time in the application of coatings.

20 Claims, No Drawings

METHODS FOR THE SPRAY APPLICATION OF WATER-BORNE COATINGS WITH COMPRESSED FLUIDS

FIELD OF THE INVENTION

This invention, in general, pertains to the field of spraying coating compositions with reduced emission of volatile organic solvent. More particularly, the present invention is directed to methods for the spray application of water-borne coatings by using supercritical fluids or subcritical compressed fluids, such as carbon dioxide or ethane, to enhance atomization and spray formation at lower water levels and higher viscosities.

BACKGROUND OF THE INVENTION

Many industrial processes spray coating compositions that contain viscous or solid polymeric components, such as coatings, adhesives, release agents, gel coats, lubricants, and agricultural materials. To spray such materials, it has been common practice to use relatively large amounts of organic solvents. The solvents perform a variety of functions, such as to dissolve the polymers; to reduce viscosity for spraying; to provide a carrier medium for dispersions; and to give proper flow when the composition is sprayed onto a substrate, such as coalescence and leveling to form a smooth coherent coating film. However, the solvents released by the spray operation are a major source of air pollution.

There are several patents which disclose new spray technology that can markedly reduce organic solvent emissions, by using environmentally acceptable supercritical fluids or subcritical compressed fluids, such as carbon dioxide, to replace the solvent fraction in solvent-borne compositions that is needed to obtain low spray viscosity: U.S. Pat. Nos. 4,923,720 and 5,108,799 disclose methods for using supercritical fluids for the spray application of coatings. U.S. Pat. No. 5,106,650 discloses methods for using supercritical carbon dioxide for the electrostatic spray application of coatings. U.S. Pat. No. 5,009,367 discloses methods for using supercritical fluids for obtaining wider airless sprays. U.S. Pat. No. 5,057,342 discloses methods for using supercritical fluids for obtaining feathered airless sprays. U.S. Pat. No. 4,882,107 discloses methods for using supercritical fluids to apply mold release agents, such as in the production of polyurethane foam. U.S. Pat. No. 5,066,522 discloses methods for using supercritical fluids to apply adhesive coatings.

The conventional atomization mechanism of airless sprays is well known and is discussed and illustrated by Dombroski, et al., *Chemical Engineering Science* 18: 203 (1963). The coating exits the orifice as a liquid film that becomes unstable from shear induced by its high velocity relative to the surrounding air. Waves grow in the liquid film, become unstable, and break up into liquid filaments that likewise become unstable and break up into droplets. Atomization occurs because cohesion and surface tension forces, which hold the liquid together, are overcome by shear and fluid inertia forces, which break it apart. This process is shown photographically for an actual paint in the brochure entitled "Cross-Cut TM Airless Spray Gun Nozzles", Nordson Corporation, Amherst, Ohio. Often the liquid film extends far enough from the orifice to be visible before atomizing into droplets. The sprays are generally angular in shape and have a relatively narrow fan width, that is, a fan width that is not much greater than the fan width rating of the spray tip being used. Viscous dissipation markedly reduces atomization energy, so relatively coarse atomization typically results. As used herein, the terms "liquid-film spray" and "liquid-film atomization" are understood to mean a spray, spray fan, or spray pattern in which atomization occurs by this conventional mechanism.

Liquid-film sprays characteristically form a "tailing" or "fishtail" spray pattern, wherein coating material is distributed unevenly in the spray. Surface tension often gathers more liquid at the edges of the spray fan than in the center, which can produce coarsely atomized jets of coating that sometimes separate from the spray. At other times the edges of the spray are thickened so that more coating is deposited at the top and bottom than in the center of the spray. These deficiencies produce a nonuniform deposition pattern that makes it difficult to apply a uniform coating.

Examples of liquid-film sprays are shown photographically in the aforementioned commonly assigned patents, namely, in FIGS. 4$a$, 4$b$, 4$c$, 4$d$, 10$a$, 11$a$, 12$a$, and 12$b$ of U.S. Pat. No. 5,057,342 and in FIGS. 3$a$, 3$b$, 3$c$, 9$a$, 9$b$, and 9$c$ in U.S. Pat. No. 5,009,367.

As disclosed in the aforementioned patents, supercritical fluids or subcritical compressed fluids such as carbon dioxide or ethane are not only effective viscosity reducers, they can produce a new airless spray atomization mechanism, which can produce finer droplet size than by conventional airless spray methods and a feathered spray needed to apply high quality coatings. Without wishing to be bound by theory, the new type of atomization is believed to be produced by the dissolved carbon dioxide suddenly becoming exceedingly supersaturated as the spray mixture experiences a sudden and large drop in pressure in the spray orifice. This creates a very large driving force for gasification of the carbon dioxide. The carbon dioxide gas released from solution during depressurization expands in volume and produces an expansive force that overwhelms the cohesion, surface tension, and viscosity forces that oppose atomization and normally bind the fluid flow together.

A different atomization mechanism is evident because atomization appears to occur right at the spray orifice instead of away from it. Atomization is believed to be due not to break-up of a liquid film from shear with the surrounding air but, instead, to the force of the expanding carbon dioxide gas. Therefore, no liquid film is visible coming out of the nozzle.

Furthermore, because the spray is no longer bound by cohesion and surface tension forces, it typically leaves the nozzle at a much wider angle than normal airless sprays and produces a "feathered" spray with tapered edges like an air spray. This typically produces a rounded, parabolic-shaped spray fan, instead of the sharp angular fans typical of conventional airless sprays. The spray also typically has a much wider fan width than conventional airless sprays produced by the same spray tip. As used herein, the terms "decompressive spray" and "decompressive atomization" are understood to mean to a spray, spray fan, or spray pattern that has the preceding characteristics.

Examples of decompressive sprays are shown photographically in the aforementioned patents, namely, in FIGS. 3$a$, 3$b$, 3$c$, 3$d$, 3$e$, 10$b$, 11$b$, 12$c$, 12$d$, and 13 of U.S. Pat. No. 5,057,342 and in FIGS. 4$b$, 4$c$, 8, and 9$d$ of U.S. Pat. No. 5,009,367.

Laser light scattering measurements and comparative spray tests show that this decompressive atomization can produce fine droplets that are in the same size range as air spray systems, instead of the relatively coarse droplets produced by liquid-film airless sprays. For a properly formulated coating composition, the droplet size range and distribution are ideal for minimizing orange peel and other surface defects commonly associated with spray application. This fine particle size provides ample surface area for the dissolved carbon dioxide to very rapidly diffuse from the droplets within a short distance from the spray nozzle. Therefore, the coating is essentially free of carbon dioxide before it is deposited onto the substrate.

A liquid-film spray can undergo a transition to a decompressive spray as the concentration of supercritical fluid or subcritical compressed fluid such as carbon dioxide is increased. The transition can also occur as the temperature is increased, for suitable concentrations. The transition has been found to occur over a relatively narrow range of concentration or temperature. As the carbon dioxide concentration is increased, the liquid-film spray at first remains generally angular in shape, has a relatively constant or slightly increased width that is characteristic of the width obtained when the composition is sprayed with no carbon dioxide, and has a relatively large average droplet size. A visible liquid film can typically be seen to recede towards the orifice. Atomization occurs predominately due to instability induced by shear with the surrounding air. The spray pattern is controlled predominately by the cohesion, viscosity, and surface tension forces. The boundary of the liquid-film region typically occurs about at the carbon dioxide concentration at which the liquid film disappears. As the concentration increases, the spray then passes through a transition region in which the spray pattern typically undergoes dramatic changes, which depend upon the coating composition, as it transforms from a liquid-film to a decompressive spray and the atomization mechanism changes. The shape and width of the transition spray typically changes markedly for relatively small changes in carbon dioxide concentration. For some coating compositions, the spray pattern collapses from a flat fan into a narrower, irregular, conical spray and then expands into a wider, flat, parabolic decompressive spray. Sometimes the spray collapses completely into a single round jet, or into two, three, or more jets spaced at irregular angles, before expanding into a decompressive spray. For other coating compositions, the spray pattern remains mostly planar but the center flares outward, more as the spray narrows and then less as the spray expands into a decompressive spray. Sometimes the spray remains planar as a decompressive spray pattern forms superimposed upon the liquid-film spray pattern, which simultaneously disappears. For still other coating compositions, the angular spray pattern first becomes much wider and then changes to a parabolic shape. The transition sprays are irregular and often unstable because neither the expansive force from the release of the gaseous carbon dioxide nor the cohesion, viscosity, and surface tension forces of the coating composition dominate the atomization and spray pattern formation. The different types of spray transitions are due to different surface tension and rheological properties of different coating compositions. A decompressive spray forms when the carbon dioxide concentration becomes high enough for the expansive force of the gaseous carbon dioxide to overcome the cohesion, viscosity, and surface tension forces of the coating composition in the forming spray. The decompressive spray that forms is generally substantially planar, mostly parabolic in shape, and significantly wider than the corresponding liquid-film spray. Near the spray boundary, the decompressive spray may have some jetting or be somewhat flared at the center of the spray, and the spray pattern may be fingered. However, these typically dissipate and the spray pattern becomes more uniform at higher compressed fluid concentration. The planar decompressive spray, in addition to being wider, is also characteristically thicker across the plane of the spray than the corresponding liquid-film spray. One of the characteristics of the transition from a liquid-film to a decompressive spray is a marked decrease in the average droplet size of the spray.

U.S. Pat. No. 5,057,342 provides examples of the transition from a liquid-film to a decompressive spray for supercritical carbon dioxide. FIGS. 12a to 12d show the transition for a thermosetting acrylic coating composition at a temperature of 60 Celsius and a pressure of 1600 psig. FIG. 12a shows a liquid-film spray with 14 percent carbon dioxide (by weight). The liquid film can be seen jetting from the orifice. FIG. 12b illustrates a liquid-film spray at the boundary of the transition region, which occurs with about 19.7 percent carbon dioxide. The liquid film has disappeared but the spray is still significantly angular in shape. FIG. 12c shows a decompressive spray that forms with about 22 percent carbon dioxide, which is close to the transition region. The spray flares outward somewhat from the plane of the spray at the center. The angle at which the spray emerges from the orifice is much larger than for the liquid-film spray. FIG. 12d shows the uniform decompressive spray that forms with about 25 percent carbon dioxide.

Generally, the preferred upper limit of supercritical fluid or compressed fluid addition, such as carbon dioxide, is that which is capable of being miscible with the polymeric coating composition. This practical upper limit is generally recognizable when the admixture containing coating composition and carbon dioxide breaks down from one phase into two fluid phases. Spraying significantly inside the two phase region is avoided, because a significant amount of organic solvent is typically extracted from the liquid polymer phase into the liquid carbon dioxide phase, which can significantly increase the viscosity of the liquid spray mixture. This increases the droplet size and causes the spray pattern to deteriorate. Furthermore, for coating applications, film formation usually deteriorates, because the solvent loss causes the deposited coating material to be too viscous to flow out properly on the substrate.

Because of increased environmental concern about the emissions of solvent from spray coating operations, water-borne coatings have also been developed, wherein water is used to achieve low atomization viscosity instead of the fast-evaporating organic solvents used in solvent-borne coatings. Water-borne coatings have found widespread use for applications having substrates that tolerate water. However, water-borne coatings have generally not provided the performance and application properties that were initially expected. Water has a relatively low evaporation rate when compared to fast evaporating solvents used in solvent-borne coatings, and it is much slower evaporating than supercritical fluids such as carbon dioxide. One difficult problem is that often an insufficient amount of water evaporates from the spray, so a desirable high deposition viscosity is not achieved, unlike solvent-borne coatings and coatings applied with supercritical fluids. Therefore, water-borne coatings have persistent problems with runs and sags occurring in the applied coating, because of low deposition viscosity. Another difficult problem is that line speeds on water-borne coating spray lines are often significantly slower than for solvent-borne coatings, which significantly reduces productivity, because water evaporates more slowly from the applied coating than comparable organic solvents. These problems are made more difficult by the water evaporation rate being sensitive to the relative humidity of the spray environment. Water-borne coatings generally can not be applied under conditions of high relative humidity without serious coating defects. These defects arise when the water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes often result.

Therefore, there is clearly a need for an improved process by which water-borne coatings can be sprayed at lower water levels and higher viscosities. Such a process would give: improved coating quality by decreasing coating sagging and running, because less water would need be evaporated in the spray; improved productivity and higher line speed, because less water would need to be evaporated from the applied coating; and less sensitivity to relative humidity.

Prior to the present invention, it was unknown how a supercritical fluid or subcritical compressed fluid such as carbon dioxide would interact with a water-borne coating composition. As disclosed in the aforementioned U.S. Pat. Nos. 5,009,367 and 5,057,342, generally the coating compositions used for spray application by supercritical fluids may contain up to about 30 percent by weight of water, preferably up to about 20 percent, in the solvent fraction provided that a coupling solvent is preferably also present in the composition. A coupling solvent is a solvent in which the polymers in the composition are at least partially soluble and which is at least partially miscible with water. The coupling solvent enables mutual solubility and miscibility of the polymers, solvents, and water within a single liquid phase. As further disclosed in Australian Patent No. 630170, issued Feb. 12, 1993, the solubility of supercritical carbon dioxide in coating compositions that contain a coupling solvent and up to about 30 percent water by weight of the solvent fraction is often substantially the same as that for the coating composition containing no water. A higher quantity of water, however, was generally found not to be desirable. Too much water could result in phase separation, that is, the composition could break down into a water phase and an organic phase, which could cause poor spraying and coating performance. Higher levels of water could also significantly reduce the solubility of the supercritical carbon dioxide in the coating composition and therefore the amount of supercritical carbon dioxide diluent that could be used for spraying. Phase separation caused by excess supercritical carbon dioxide was found to give generally poor spray and coating performance and therefore was avoided. It was believed that this reduced level of dissolved carbon dioxide would give insufficient viscosity reduction of the viscous coating composition and also insufficient expansive force to obtain a decompressive spray needed to apply high quality coatings. Therefore, it was generally believed that the much lower solubility of supercritical carbon dioxide in water-borne coatings, even with the use of coupling solvents, would preclude spray application of water-borne coatings with supercritical fluids or subcritical compressed fluids like carbon dioxide.

SUMMARY OF THE INVENTION

By virtue of the present invention, methods have been discovered that are indeed able to accomplish the above noted objectives. Water-borne coating compositions can be sprayed at reduced water contents and higher viscosities by using supercritical or subcritical compressed fluids such as carbon dioxide, ethane, or nitrous oxide, thereby giving improved coating quality and higher productivity by decreasing sagging and running, shortening dry times by applying less water, and lowering sensitivity to the relative humidity of the spray booth air.

In its broadest embodiment, the present invention is directed to a process for spraying a water-borne polymeric composition having reduced water content, which comprises:

(1) forming a liquid mixture in a closed system, said liquid mixture containing a water-borne polymeric composition and compressed fluid comprising:
  (a) a water-borne polymeric composition containing a solvent fraction having at least about 35 percent water by weight and at least one coupling agent for the compressed fluid; and
  (b) at least one compressed fluid which is compatible with or can be made compatible with said water-borne polymeric composition and which is at least in an amount which renders said liquid mixture capable of being sprayed, wherein the compressed fluid is a gas at standard conditions of 0° C. and one atmosphere pressure (STP); and (2) spraying said liquid mixture by passing the mixture under pressure through an orifice to form a liquid spray.

In a preferred embodiment, the water-borne composition contains at least one polymer capable of forming a coating on a substrate, which may be a water-dispersible polymer or a water-soluble polymer.

In another preferred embodiment, the at least one coupling agent for said compressed fluid comprises at least one coupling solvent or at least one coupling polymer.

In still another preferred embodiment, the liquid mixture of water-borne coating composition and compressed fluid contains a finely dispersed liquid compressed fluid phase. The water-borne polymeric composition preferably contains at least one organic solvent that is capable of being extracted from said water-borne polymeric composition into the compressed fluid phase. Alternatively, the liquid mixture may contain at least one organic solvent (c) which is immiscible with said water-borne polymeric composition and which is at least partially miscible with said at least one compressed fluid under pressure.

In yet another preferred embodiment, the at least one compressed fluid is selected from the group consisting of carbon dioxide, nitrous oxide, ethane, ethylene, propane, propylene, butane, and isobutane. The compressed fluid is preferably a supercritical fluid at the temperature and pressure at which the liquid spray mixture is sprayed. The most preferred compressed fluids are carbon dioxide and ethane.

In still yet another preferred embodiment, the process further comprises controlling the pH of said liquid mixture to prevent polymer precipitation when admixing carbon dioxide with the water-borne polymeric composition, thereby making carbon dioxide compatible with water-borne polymeric compositions that are sensitive to acidic pH.

In one more preferred embodiment, the liquid mixture is passed through an elongated orifice to form a liquid spray.

In another embodiment, the present invention is directed to a process for spraying a water-borne polymeric composition having reduced water content, which comprises:

(1) forming a liquid mixture in a closed system, said liquid mixture containing a water-borne polymeric composition and a compressed fluid comprising:
   (a) a water-borne polymeric composition containing a solvent fraction having at least about 35 percent water by weight; and
   (b) at least one compressed fluid which is compatible with or can be made compatible with said water-borne polymeric composition; which is present in said liquid mixture as a finely dispersed liquid compressed fluid phase; and which is at least in an amount which renders said liquid mixture capable of being sprayed, wherein the compressed fluid is a gas at standard conditions of 0° C. and one atmosphere pressure (STP); and (2) spraying said liquid mixture by passing the mixture under pressure through an orifice to form a liquid spray.

In a preferred embodiment, the water-borne composition contains at least one polymer capable of forming a coating on a substrate, which may be a water-dispersible polymer or a water-soluble polymer.

In another preferred embodiment, the at least one compressed fluid is a supercritical fluid at the temperature and pressure at which said liquid spray mixture is sprayed.

In still another preferred embodiment, the water-borne coating composition contains at least one organic solvent that is capable of being extracted from said water-borne coating composition into the compressed fluid, thereby enabling said compressed fluid to form the liquid compressed fluid phase at the supercritical temperature and pressure.

In yet another preferred embodiment, the liquid mixture contains in addition at least one organic solvent (c) which is immiscible with said water-borne coating composition; which is at least partially miscible with said at least one compressed fluid under pressure; and which is present at least in an amount that enables said compressed fluid to form the liquid compressed fluid phase at a supercritical temperature and pressure.

The at least one compressed fluid is preferably selected from the group consisting of carbon dioxide, nitrous oxide, ethane, ethylene, propane, propylene, butane, isobutane, and mixtures thereof. Carbon dioxide and ethane are the most preferred compressed fluids.

Here again, in another preferred embodiment, the process further comprises controlling the pH of said liquid mixture to prevent polymer precipitation when admixing carbon dioxide with the water-borne coating composition, thereby making carbon dioxide compatible with water-borne coating compositions that are sensitive to acidic pH.

Here again, in one more preferred embodiment, the liquid mixture is passed through an elongated orifice to form a liquid spray.

In still another embodiment, the present invention is directed to process for spraying a water-borne coating composition having reduced water content, which comprises:

(1) forming a liquid mixture in a closed system, said liquid mixture containing a water-borne coating composition and a compressed fluid comprising:
   (a) a water-borne coating composition containing a solvent fraction having at least about 35 percent water by weight and containing at least one coupling agent for the compressed fluid; and
   (b) at least one compressed fluid which is compatible with or can be made compatible with said water-borne coating composition and which is at least in an amount which renders said liquid mixture capable of being sprayed, wherein the compressed fluid is a gas at standard conditions of 0° C. and one atmosphere pressure (STP); and (2) spraying said liquid mixture by passing the mixture under pressure through an orifice to form a liquid spray.

In yet another embodiment, the present invention is directed to a process for spraying a water-borne coating composition having reduced water content, which comprises:

(1) forming a liquid mixture in a closed system, said liquid mixture containing a water-borne coating composition and a compressed fluid comprising:
   (a) a water-borne coating composition containing a solvent fraction having at least about 35 percent water by weight; and
   (b) at least one compressed fluid which is compatible with or can be made compatible with said water-borne coating composition; which is present in said liquid mixture as a finely dispersed liquid compressed fluid phase; and which is at least in an amount which renders said liquid mixture capable of being sprayed, wherein the compressed fluid is a gas at standard conditions of 0° C. and one atmosphere pressure (STP); and (2) spraying said liquid mixture by passing the mixture under pressure through an orifice to form a liquid spray.

DETAILED DESCRIPTION OF THE INVENTION

Throughout the description of the present invention reference to coating compositions are made. Those with skill in the art will readily appreciate that the methods of the inventions are not limited solely to water-borne coating compositions. For example, water-borne polymeric compositions such as adhesives, release agents, additive formulations, agricultural materials, lubricants and the like may also be sprayed by the methods of the present inventions.

It has been found that, by using the methods of the present invention, water-borne coating compositions can be sprayed with compressed fluids such as carbon dioxide, ethane, and nitrous oxide. This allows the water-borne coating compositions to be sprayed at lower water levels that give improved coating performance and process advantages. Because less water needs to evaporate in the spray to increase the viscosity of the coating material to a desirably high viscosity for deposition on a substrate, the persistent problem that water-borne coatings have with sagging and running can be greatly diminished or eliminated. Furthermore, because less water is deposited with the coating on the substrate, the time required for the water to evaporate is significantly reduced, thereby allowing line speeds to be increased in the coating operation, which improves productivity. Because less water needs to evaporate in the spray, the spray operation can become less sensitive to the relative humidity level of the air used in the spray booth and for drying.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at, above, or slightly below its critical point. As used herein, a "subcritical fluid" is a compressed fluid that is at a temperature and pressure at which it is not a supercritical fluid, whether it be a liquid, a gas, or a gas-liquid mixture.

Compounds which may be used as compressed fluids in the present invention include but are not limited to carbon dioxide, nitrous oxide, xenon, ethane, ethylene, propane, propylene, butane, isobutane, and mixtures thereof.

Preferably, the compressed fluid is environmentally compatible, can be made environmentally compatible by treatment, such as by thermal decomposition or incineration, or can be readily recovered from the spray environment, such as by absorption or adsorption. The utility of any of the above-mentioned compressed fluids in the practice of the present invention will depend upon compatibility with the water-borne coating composition used, the temperature and pressure of application, and the inertness and stability of the compressed fluid.

Due to environmental compatibility, low toxicity, low critical temperatures, and the ability to form a liquid compressed fluid phase at typical spray conditions, carbon dioxide, ethane, nitrous oxide, and mixtures thereof are preferred compressed fluids in the present invention. Due to relatively low cost, stability, and chemical inertness, and because it does not affect pH when dissolved in water, ethane is most preferred for water-borne coating compositions that are sensitive to acidic pH. Due to low cost, non-flammability, stability, and wide availability, carbon dioxide is most preferred for water-borne compositions that are not sensitive to acidic pH. However, carbon dioxide may be used with water-borne coating compositions that are sensitive to acidic pH if desired. Preferably, the pH is controlled or regulated sufficiently to avoid acidic pH levels that could cause stability problems for the water-borne coating composition. Use of any of the aforementioned compounds and mixtures thereof are to be considered within the scope of the present invention.

As used herein, the phrase "water-borne coating composition" is understood to mean conventional water-borne coating compositions, materials, and formulations that have no compressed fluid admixed therewith.

As used herein, the term "solvent" is understood to mean conventional solvents including water and organic solvents that have no compressed fluid admixed therewith and which are in the liquid state at conditions of about 25° C. temperature and one atmosphere absolute pressure.

The water-borne coating compositions that may be used with the present invention are generally comprised of a nonvolatile materials fraction which is capable of being sprayed and of forming a coating on a substrate. The water-borne coating compositions, in addition to the nonvolatile materials fraction, also contain a solvent fraction which is typically at least partially miscible with the nonvolatile materials fraction. As used herein, the phrase "nonvolatile materials" is understood to mean solid materials and liquid materials such as solid polymers, liquid polymers, and other compounds that are nonvolatile at a temperature of about 25° Celsius. In general, the nonvolatile materials fraction is the portion of the water-borne coating composition that remains after the solvent fraction has evaporated.

As used herein, it will be understood that the term "water-borne coating composition" includes not only coating compositions used to form protective or decorative coatings but also includes adhesives, release agents, lubricants, agricultural materials, and the like, which are capable of being sprayed to deposit a coating on a substrate.

The water-borne coating compositions that may be used with the present invention will typically have a nonvolatile materials fraction comprising at least one polymer component that is capable of forming a coating on a substrate, whether such component is a paint, enamel, lacquer, varnish, adhesive, chemical agent, release agent, lubricant, protective oil, an agricultural coating, or the like.

Generally, the nonvolatile materials used in the water-borne coating compositions of the present invention, such as the polymers, must be able to withstand the temperatures and pressures to which they are subjected after they are ultimately admixed with the compressed fluid. Such applicable polymers include thermoplastic polymers, thermosetting polymers, crosslinkable film forming systems, two-component reactive polymer systems, and mixtures thereof, typically used in water-borne coating compositions sprayed conventionally with no compressed fluid. The polymers may be solid polymers or liquid polymers and they may be dissolved, dispersed, or emulsified in the solvent fraction.

In particular, the polymeric compounds include acrylic polymers, polyesters, polyvinyl resins such as polyvinyl acetate, alkyds, polyurethanes, epoxies, phenolic resins, cellulosic polymers such as methyl cellulose, hydroxyethyl cellulose, carboxymethyl cellulose, and nitrocellulose, amino polymers such as urea formaldehyde and melamine formaldehyde, polyethylene glycols and polypropylene glycols, polyamides, drying oils, natural gums and resins, polymers containing silicon, fluorocarbons and other polymers containing fluorine, and the like.

The nonvolatile materials fraction of the water-borne coating compositions, in addition to the polymers, may contain conventional additives which are typically utilized in water-borne coatings. For example, pigments, pigment extenders, metallic flakes, fillers, surfactants, wetting agents, emulsifying agents, dispersing agents, thickeners, anti-foaming agents, coalescing agents, driers, ultraviolet absorbers, biocides, pH buffers, neutralizers, cross-linking agents, plasticizers, and mixtures thereof, may all be utilized in the water-borne coating compositions to be used with the methods of the present invention.

In addition to the nonvolatile materials fraction, the water-borne coating compositions used with the present invention contain a solvent fraction containing at least about 35 percent water by weight, preferably at least about 40 percent water, more preferably at least about 50 percent water, and most preferably at least about 60 percent water. In addition to the water, the solvent fraction may contain one or more organic solvents. The organic solvent may perform a variety of functions, such as to solubilize the polymer and other components, to give proper flow characteristics such as leveling, to adjust the drying rate, aid pigment dispersion, and the like. Generally the preferred organic solvents are water soluble, such as alcohols, glycol ethers, acetone, methyl ethyl ketone, and the like, that are typically used in water-borne coating formulations. The selection of a particular solvent fraction for a given nonvolatile materials fraction in order to form a water-borne coating composition or formulation is well known to those skilled in the art of coatings.

In the practice of the present invention, in order to derive the benefits of spraying a water-borne coating composition with reduced water content, preferably the water-borne coating composition has a water content that is less than about 95 percent by weight of the water content used to spray the water-borne composition without compressed fluid, more preferably less than about 90 percent of the water content, still more preferably less than about 80 percent of the water content, and most preferably less than about 70 percent of the water content.

Reduced water content correspondingly increases the viscosity of the water-borne coating composition. Preferably, the water-borne coating composition has a viscosity above about 75 centipoise at a temperature of 25° Celsius, more preferably above about 100 centipoise, still more preferably above about 150 centipoise, and most preferably above about 200 centipoise.

The water-borne coating will generally not have an excessively high viscosity because of the water contained therein. Because some water evaporates in the spray, the starting viscosity will generally be less than the desirable viscosity for depositing the sprayed coating material on a substrate. Accordingly, the water-borne coating composition will generally have a viscosity below about 3000 centipoise at a temperature of 25° Celsius, preferably below about 2000 centipoise, more preferably below about 1500 centipoise, still more preferably below about 1000 centipoise, and most preferably below about 700 centipoise.

Surprisingly, we have discovered that water-borne coating compositions having reduced water content, but containing at least about 35 percent water by weight of the solvent fraction, can be sprayed by using at least one compressed fluid, such as carbon dioxide, ethane, or nitrous oxide, if the water-borne coating composition contains at least one coupling agent for the compressed fluid, despite the compressed fluid generally having substantially lower solubility in water-borne coating compositions than in organic solvent-borne coating compositions and in liquid polymer coating compositions, which are the primarily used compositions of the aforementioned patents. It is commonly known that carbon dioxide, nitrous oxide, ethane, and the other hydrocarbon compressed fluids of the present invention have very low solubility in water even when under high pressure. As aforementioned, in coating compositions that contain a coupling solvent and above about 30 percent water by weight, the solubility of supercritical carbon dioxide was found to decrease to levels thought to be undesirably low for spray application, that is, below a level that was believed necessary to have sufficient expansive force to obtain a decompressive spray. However, we have now discovered that decompressive sprays and fine atomization can be obtained with much lower levels of compressed fluid than was heretofore believed possible.

For example, we have discovered that when an acrylic coating composition (Rohm & Haas Acroloid™ AT-954) having 78 percent polymer, a high viscosity of about 2000 centipoise, and no water is sprayed with supercritical carbon dioxide at a temperature of 60° Celsius and a pressure of 1800 psi, a minimum of about 24.5 percent carbon dioxide by weight is required to obtain a decompressive spray. The solubility limit was 27.6 percent carbon dioxide. However, when the same acrylic composition is sprayed at the same conditions with ethane being the supercritical compressed fluid, a decompressive spray is obtained at a much lower concentration of about 9.5 percent ethane by weight. Ethane has much lower solubility in this composition than carbon dioxide, and the solubility limit is about 10.0 percent ethane. This gives a feathered, decompressive spray having fine atomization with an average droplet size of 36 microns, which was used to apply good coatings to a substrate.

These results demonstrate that at the same spray conditions, a decompressive spray could be obtained with just 9.5 percent ethane, whereas 24.5 percent carbon dioxide is required. Therefore, for this coating composition, sufficient expansive force was available to produce a decompressive spray with just 9.5 percent compressed fluid, despite the spray solution having much less viscosity reduction than with 24.5 percent compressed fluid. However, if the composition was sprayed with 9.5 percent carbon dioxide, a liquid-film spray was obtained that is far removed from the spray transition region. The carbon dioxide just diffuses from the liquid film outside of the orifice, so the expansive force of the carbon dioxide is not utilized for atomization and spray formation.

Without wishing to be bound by theory, we have discovered that obtaining a decompressive spray is also limited by the nucleation rate at which gaseous compressed fluid is formed in the spray orifice during depressurization and not just by the magnitude of the potential expansive force available due to the compressed fluid concentration. The conditions at which a decompressive spray is formed have been found to typically comprise a relatively narrow range of compressed fluid concentration that is just below the solubility limit. Furthermore, we have discovered that the decompressive spray conditions follow the solubility limit as the solubility changes to higher or lower levels, such as due to changing the temperature, pressure, polymer level, etc.

Therefore, we have discovered that sufficient compressed fluid solubility can be obtained in water-borne coating compositions that contain at least one coupling agent for the compressed fluid to give a decompressive spray- having fine atomization, despite the compressed fluid solubility generally being substantially below that of the organic solvent-borne coating compositions and liquid polymer coating compositions of the aforementioned patents. Although the water contained in the water-borne coating compositions reduces the solubility of the compressed fluid, the water also reduces the viscosity and cohesive forces that oppose atomization, so a decompressive spray can be obtained with much less expansive force. Furthermore, the water can also aid nucleation of the compressed fluid to form a gas phase during depressurization, so that the available expansive force is better utilized. As the water content is reduced, the viscosity of the water-borne coating composition is increased, but this tends to be offset by a higher compressed fluid solubility, which reduces the viscosity and increases the level of the expansive force available for atomization.

As used herein, it will be understood that a "coupling agent" is a material that increases the solubility under pressure of the compressed fluid in the water-borne coating compositions used with the present invention. That is, the solubility of the compressed fluid in the water-borne composition when under pressure is greater with the coupling agent present in the water-borne composition than the solubility obtained at the same conditions without the coupling agent present in the water-borne composition. In particular, the solubility is greater than that obtained in water.

In the practice of the present invention, the coupling agent may comprise a coupling solvent, such as coupling solvents used in conventional water-borne coating compositions sprayed with no compressed fluid, which are used to obtain at least partial solubility of various polymers in water. The polymers are at least partially soluble in the coupling solvent, and the coupling solvent is at least partially soluble in water. Therefore, use of the coupling solvent in the water-borne composition imparts at least partial solubility of the polymer. Coupling solvents are generally chosen that give proper flowout characteristics to the coating once applied to a substrate. As such, they generally have moderate to slow evaporation rates and the overall solvent blend is chosen to have a range of evaporation rates that give proper film formation and drying. Coupling solvents have been found to also enable at least partial miscibility of the compressed fluid with water-borne coating compositions when under pressure. To function as a coupling agent for the compressed fluid, the coupling solvent should therefore have at least partial miscibility with the compressed fluid, that is, the compressed fluid should be at least partially soluble in the coupling solvent when under pressure. Preferably the coupling solvent has high miscibility with the compressed fluid, that is, the compressed fluid has high solubility in the coupling solvent when under pressure. Coupling solvents are well known to those skilled in the art and any coupling solvent which is able to meet the aforementioned characteristics, namely, of increasing the solubility of the compressed fluid in the water-borne coating composition, may be used as a coupling agent in the present invention.

Applicable coupling solvents include, but are not limited to, ethylene glycol ethers; propylene glycol ethers; chemical and physical combinations thereof; lactams; cyclic ureas; and the like.

Specific coupling solvents include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

In addition to the coupling solvent, other solvents may be used as well, if desired.

In the practice of the present invention, the coupling agent may also comprise a coupling polymer having coupling functionality for the compressed fluid. That is, polymers having chemical properties such that the presence of the coupling polymer in the water-borne coating composition increases the solubility of the compressed fluid when under pressure. Such polymers are at least partially miscible with water and they are at least partially miscible with the compressed fluid when under pressure, that is, the compressed fluid is at least partially soluble in the polymer when under pressure. Preferably the coupling polymer has high miscibility with the compressed fluid, that is, the compressed fluid has relatively high solubility in the coupling polymer when under pressure. Therefore, when used in the solvent-borne coating composition, the polymers impart at least partial miscibility of the compressed fluid with water-borne compositions when under pressure. Preferably, the compressed fluid has a solubility in the coupling polymer of at least about 5 percent by weight, more preferably at least about 10 percent, still more preferably at least about 15 percent, and most preferably at least about 20 percent when under pressure. Surprisingly, carbon dioxide has been found to have high solubility in different types of polymers. The following carbon dioxide solubilities were measured for polymers containing little or no organic solvent, when under a pressure of about 1600 pounds per square inch: 17 percent in an acrylic polymer (no solvent), 24 percent in an epoxy polymer (no solvent), 26 percent in a melamine-formaldehyde polymer (2% solvent), 27 percent in a urea-formaldehyde polymer (5% solvent), 36 percent in an epoxidized fatty ester (no solvent), 40 percent in a silicone polymer (no solvent), and 43 percent in a polyester polymer (5% solvent). The coupling polymers may have substituent groups with coupling functionality for the compressed fluid. The substituent groups functionality is generally similar to the functionality of coupling solvents, which is well known to those skilled in the art. If desired, one or more coupling solvents may be used in combination with one or more coupling polymers. Other coupling agents may also be used.

In the practice of the present invention, the water-borne composition containing the at least one coupling agent for the compressed fluid has a compressed fluid solubility when under pressure preferably of at least about 2 percent by weight, more preferably of at least about 4 percent, still more preferably of at least about 6 percent, and most preferably of at least about 8 percent.

When carbon dioxide dissolves in water, some of the carbon dioxide forms carbonic acid, which increases the acidity and lowers the pH of the system. Therefore, when carbon dioxide is used as the compressed fluid with water-borne coating compositions that are sensitive to lowered pH level, particularly to acidic pH levels, preferably the pH is controlled or regulated sufficiently when the liquid mixture is formed to avoid pH levels that cause stability problems for the water-borne coating composition. For example, water-borne coating compositions that contain a water-dispersible polymer often form a stable polymer dispersion at sufficiently basic pH, but the dispersion becomes unstable and the polymer may precipitate at sufficiently acidic pH. The dispersions are generally more stable within a specific pH range. Surface agents, particularly anionic ones, are likewise generally most effective within certain pH ranges. Sometimes water-soluble polymers are soluble at basic pH but become insoluble at low pH. Therefore, desirably the pH of the liquid mixture is controlled to prevent polymer precipitation when admixing the carbon dioxide with the water-borne coating composition. Preferably the pH is controlled by using a pH buffer in the water-borne coating composition. The level of pH buffer required depends upon the carbon dioxide solubility; higher solubility requires a higher buffer level. Buffers are commonly used in water-borne coating compositions to maintain the pH at a desirable level, as is known to those skilled in the art. Such buffers may be used with the present invention. Generally a higher level of buffer is used. One example of a buffer is a carbonate/bicarbonate buffer, which regulates the pH at about 10. The pH may also be controlled by using alkali or other basic materials such as sodium hydroxide, calcium carbonate, and other salts. Ammonia is a preferred alkali material for controlling the pH, because it evaporates from the coating, so water resistance is not hurt. Preferably the liquid mixture is heated when ammonia is used, because carbamates decompose when heated.

In the practice of the present invention, the liquid mixture of water-borne coating composition and compressed fluid preferably contains at least about 2 percent compressed fluid by weight, more preferably at least about 4 percent compressed fluid, still more preferably at least about 6 percent compressed, and most preferably at least about 8 percent compressed fluid, in order to render said liquid mixture capable of being sprayed. If desired, the liquid mixture may contain an excess of compressed fluid such that a dispersed gas phase is formed in the liquid mixture.

The liquid mixture of water-borne coating composition and compressed fluid thus formed in a closed system is sprayed by passing the liquid mixture under pressure through an orifice to form a liquid spray. An orifice is a hole or an opening in a wall or housing, such as in a spray tip of a spray nozzle on a spray gun, through which the liquid mixture flows in going from a region of higher pressure, such as inside the spray gun, into a region of lower pressure, such as the air environment outside of the spray gun and around a substrate.

The environment into which the water-borne coating composition is sprayed is not narrowly critical. However, the pressure therein must be sufficiently lower than the spray pressure to enable rapid gasification and expansion of the compressed fluid to occur during spray formation. Preferably, the polymeric mixture is sprayed into air under conditions at or near atmospheric pressure. Other gaseous environments can also be used. The relative humidity of the air or other gaseous environment should allow sufficient evaporation of water from the liquid spray in order to produce desirable coating formation on a substrate. Therefore excessively high relative humidity should be avoided and low relative humidity is preferred.

Although high spray pressures of 5000 psi and higher may be used, preferably the spray pressure is below about 3000 psi, more preferably below about 2000 psi. Very low pressure is generally not compatible with high compressed fluid solubility in the water-borne coating composition. Therefore, preferably the spray pressure is above about 50 percent of the critical pressure of the compressed fluid, more preferably above about 75 percent of the critical pressure, and most preferably above, at, or slightly below the critical pressure.

Preferably, the spray temperature of the liquid mixture is below about 150° Celsius, more preferably below about 100° Celsius, and most preferably below about 80° Celsius. The temperature level that may be utilized will in general depend upon the stability of the water-borne coating composition. Reactive systems must generally be sprayed at lower temperature than non-reactive systems. Preferably, the spray temperature of the liquid mixture is above about 20° Celsius, more preferably above about 25° Celsius, and most preferably above, at, or slightly below the critical temperature of the compressed fluid. The liquid mixture is preferably heated to a temperature that substantially compensates for the cooling effect caused by expansion of the compressed fluid during spray formation, thereby increasing the water evaporation rate from the spray. Heating also lowers the viscosity and increases the rate at which the compressed fluid is released as a gas during depressurization, thereby increasing the expansive force used for atomization.

The liquid spray is preferably sprayed at a temperature and pressure at which the compressed fluid is a supercritical fluid.

Liquid spray droplets are produced which generally have an average diameter of one micron or greater. Preferably, the droplets have average diameters of about 5 to about 150 microns, more preferably from about 10 to about 100 microns, still more preferably from about 15 to about 70 microns, and most preferably from about 20 to about 50 microns.

The compressed fluid is preferably present in the liquid mixture in an amount which produces a decompressive spray at the given spray temperature and pressure. Preferably the liquid spray has a feathered spray pattern. Preferably the spray pattern has a width that is greater than the spray pattern obtained when the water-borne coating composition is sprayed through the orifice under pressure with no compressed fluid admixed therewith.

In the practice of the present invention, the compressed fluid may be present in the liquid mixture in an amount above the solubility limit in the water-borne coating composition so as to form a liquid mixture that contains a finely dispersed liquid compressed fluid phase. We have discovered that the dispersed liquid compressed fluid can improve atomization of water-borne coating compositions, because it increases the expansive force of the compressed fluid without substantially affecting coating formation. As aforementioned, this is contrary to what is practiced when organic solvent-borne coating compositions are sprayed with compressed fluids, where spraying significantly inside the two phase region is avoided to prevent solvent loss from the polymer phase, which can significantly increase viscosity and cause the spray and applied coating to significantly deteriorate. However, because the excess compressed fluid extracts very little water, which is usually the primary diluent in the water-borne coating composition, the viscosity of the water phase does not increase markedly. Furthermore, because compressed fluid solubility is generally much lower in water-borne coating compositions than in organic solvent-borne coating compositions, using a higher level of expansive force than what is available at the solubility limit of the compressed fluid is generally beneficial, because the finer atomization obtained generally increases coating quality more than any deterioration that would be caused by viscosity increase or solvent loss. The amount of compressed fluid used that is above the solubility limit should be such that the liquid compressed fluid phase remains substantially finely dispersed in the liquid mixture and gives proper atomization. If the amount of compressed fluid is excessively high, larger than desirable agglomerations of the liquid compressed fluid phase can form in the liquid mixture, which become more difficult to maintain as a uniform dispersion and may disrupt the spray. Therefore, although larger quantities may be used, the amount of compressed fluid present in the liquid mixture is preferably less than about 30 percentage points above the solubility limit, more preferably less than about 25 percentage points above the solubility limit, and most preferably less than about 20 percentage points above the solubility limit.

The liquid compressed fluid phase is preferably finely dispersed into the liquid mixture by vigorously agitating or mixing the liquid mixture as the compressed fluid is admixed with the water-borne coating composition. How the materials are admixed is not critical to the practice of the present invention, provided that the liquid compressed fluid phase becomes substantially finely dispersed in the liquid mixture. Static or powered mixers may be used or mixing may be provided by the churning and shearing actions caused by passing the liquid mixture through a pump, check valve, and the like. To maintain the liquid compressed fluid phase finely dispersed in the liquid mixture, the liquid mixture is preferably periodically or continually agitated or mixed until it is sprayed. Periodic mixing can be provided by circulating the liquid mixture in a loop that contains the spray gun, a mixing device, and a circulating pump.

Forming and maintaining the finely dispersed liquid compressed fluid phase in the liquid mixture may be aided by using a dispersion, emulsifying, or stabilization agent for the compressed fluid in the practice of the present invention. Such agents are generally surfactant materials, such as TERGITOL TM nonionic surfactant NP-10, that are used to produce more or less stable mixtures of immiscible liquids such as hydrocarbons in water (Martens, Charles R, Water-Borne Coatings, Van Nostrand Reinhold, New York, 1981). They promote ease of mixing by reducing interfacial tension. The surfactants generally comprise long chain molecules that have a hydrophilic end and a lipophilic end. Such surfactant materials are commonly used in water-borne coating compositions that contain dispersed polymers, as known by those skilled in the art. Such materials may also aid in forming and maintaining a dispersion of the liquid compressed fluid phase, which typically has properties similar to a hydrocarbon material. As much as five percent or more based on the vehicle solid weight may be required.

In order for the compressed fluid to form a liquid compressed fluid phase at temperatures and pressures at which it is a supercritical fluid, the water-borne coating composition preferably contains at least one organic solvent that is capable of being extracted from said water-borne coating composition into the compressed fluid phase. Then the compressed fluid phase comprises a liquid solution of compressed fluid and organic solvent when at pressures above the bubble point pressure for the liquid mixture. The mixture of organic solvent and compressed fluid forms a liquid phase at conditions at which the compressed fluid is a supercritical fluid, because the critical temperature for the solvent/compressed fluid mixture is much higher than the critical temperature of the compressed fluid by itself, whenever the compressed fluid phase contains more than a few percent organic solvent be weight. To be capable of being extracted from the water-borne coating composition into the compressed fluid, the organic solvent should be at least partially miscible with the compressed fluid when under pressure, preferably highly miscible. Alternatively, a relatively small amount of organic solvent that is substantially insoluble in the water-borne coating composition may be added to the liquid mixture to enable the compressed fluid to form a liquid compressed fluid phase at supercritical conditions.

We have also discovered that a decompressive spray can generally be obtained at lower compressed fluid concentrations and temperatures, than are obtained with conventional airless spray orifices, by using an elongated orifice passageway to spray the liquid mixture of water-borne coating composition and compressed fluid. The elongated orifice passageway is preferably elongated in at least an amount such that when the liquid mixture is sprayed through the elongated orifice passageway, a decompressive spray is produced. Without wishing to be bound by theory, it is believed that the elongated orifice passageway increases the time available for nucleation to a gaseous compressed fluid phase to occur relatively uniformly within the liquid mixture as it depressurizes in the orifice passageway, because the flow time through the orifice passageway is increased. That is, the flow time can be matched to the nucleation time required for the compressed fluid concentration, temperature, and pressure at which the liquid mixture is sprayed. This can be particularly important at relatively low compressed fluid concentrations, where longer diffusion times are necessary for nucleation to occur from the compressed fluid dissolved in the water-borne coating composition.

The elongated orifice passageway is preferably sufficiently long relative to the equivalent diameter to effectively produce the decompressive spray, but it must not be so excessively long that an excessive amount of the compressed fluid is converted to a gas while still within the orifice, so that the expansive force is severely depleted before the spray is discharged from the orifice. Preferably, the ratio of length to diameter is greater than about 2 and less than about 20, more preferably greater than about 3 and less than about 15, most preferably greater than about 4 and less than about 10. So too, the length of the orifice passageway should desirably be in the range of from about 0.020 inch to about 0.400 inch, and more preferably from about 0.040 inch to about 0.300 inch. This is in contrast to the conventional length of the prior art orifice passageways which typically are in the range of from about 0.002 inch to about 0.020 inch.

The orifice sizes suitable for the practice of the present invention generally range from about 0.004 inch to about 0.030 inch diameter, although larger and smaller orifices may be used. Because the orifices are generally not circular in cross-section, the diameters referred to are equivalent to a circular diameter. The proper selection is determined by the orifice size that will supply the desired coating spray rate and accomplish proper atomization for the coating. Orifice sizes of from about 0.007 inch to about 0.025 inch equivalent diameter are preferred, although smaller and larger orifice sizes may be used. Orifice sizes of from about 0.009 inch to about 0.020 inch equivalent diameter are more preferred. Spray tips, spray nozzles, and spray guns used for conventional and electrostatic airless and air-assisted airless spraying of water-borne coating formulations such as paints, lacquers, enamels, and varnishes are suitable for spraying the liquid mixtures of the present invention. Spray guns, nozzles, and tips are preferred 1) that do not have excessive flow volume between the orifice and the valve that turns the spray on and off and 2) that do not obstruct the wide angle at which the spray typically exits the spray orifice. The most preferred spray tips and spray guns are the UNICARB® spray tips and spray guns manufactured by Nordson Corporation. Devices and flow designs, such as pre-orifices or turbulence promoters, that promote turbulent or agitated flow in the liquid mixture prior to passing the mixture through the orifice may also be used. The pre-orifice preferably does not create an excessively large pressure drop in the flow of liquid mixture.

The liquid mixture of water-borne coating composition and compressed fluid may be prepared for spraying by any of the spray apparatus disclosed in the aforementioned patents or other apparatus. The spray apparatus may also be a UNICARB® System Supply Unit manufactured by Nordson Corporation to proportion, mix, heat, and pressurize coating compositions with compressed fluids such as carbon dioxide for the spray application of coatings.

Surprisingly, we have furthermore discovered that water-borne coating compositions having reduced water content and increased viscosity, but containing at least about 35 percent water by weight of the solvent fraction, can be sprayed by using at least one compressed fluid, which is compatible with or can be made compatible with the water-borne coating composition, under conditions in which the compressed fluid has very little or no solubility in the water-borne coating composition, because a coupling agent for the compressed fluid is not present. The liquid mixture of water-borne coating composition and at least one compressed fluid is formed in a closed system such that the compressed fluid is substantially present in the liquid mixture as a finely dispersed liquid compressed fluid phase and is present at least in an amount which renders the liquid mixture capable of being sprayed. The liquid mixture is sprayed by passing the mixture under pressure through an orifice to form a liquid spray, which may be used to deposit a liquid coating on a substrate.

We have surprisingly discovered that a decompressive spray with fine atomization can be produced by the liquid mixture despite the absence of any significant viscosity reduction by the compressed fluid being dissolved in the water-borne coating composition and despite the absence of any significant nucleation to a gas phase occurring by the compressed fluid being dissolved within the viscous water phase during depressurization in the spray orifice. Therefore, the expansive force for formation of a decompressive spray must come entirely from the finely dispersed liquid compressed fluid phase in the liquid mixture. However, it would have been thought by one skilled in the art that this decompressive release of gaseous compressed fluid, which occurs entirely external to the viscous water-borne coating phase instead of significantly from within it, would have produced an expansive force that would be insufficiently transmitted to the water-borne coating composition to effectively atomize the viscous water-borne coating composition and form a decompressive spray. Contrary to expectation, we have discovered that as the amount of finely dispersed liquid compressed fluid phase is increased in the liquid mixture, the spray does indeed undergo a transition from an angular liquid-film spray to a parabolic decompressive spray which is similar to that which occurs when a significant amount of the compressed fluid is dissolved within the sprayed material. As the amount of finely dispersed liquid compressed fluid phase is increased to a still higher level, finer atomization is obtained in the decompressive spray due to the increased expansive force. Likewise, the spray undergoes a transition from a fishtail spray to a leathered spray and it undergoes a transition from a narrow spray to a wider spray having a width greater than the width obtained when the water-borne coating composition is sprayed without the compressed fluid by the same spray tip.

The amount of compressed fluid that is used in the liquid mixture should be such that the liquid compressed fluid phase remains substantially finely dispersed in the liquid mixture and gives proper atomization. If the amount of compressed fluid is excessively high, larger than desirable agglomerations of the liquid compressed fluid can form in the liquid mixture, which can become more difficult to maintain as a uniform dispersion. Therefore, although larger quantities may be used, the amount of compressed fluid present in the liquid mixture is preferably less than about 40 percent by weight, more preferably less than about 35 percent, still more preferably less than about 30 percent, and most preferably less than about 25 percent. The amount of compressed fluid present in the liquid mixture should be at least an amount which renders the liquid mixture capable of being sprayed. The amount required will depend upon the viscosity and rheological properties of the water-borne coating composition. In general, higher viscosity will require a higher level of compressed fluid. The liquid mixture preferably contains at least about 4 percent compressed fluid, more preferably at least about 6 percent compressed fluid, still more preferably at least about 10 percent compressed fluid, and most preferably at least about 15 percent compressed fluid. Preferably the liquid mixture contains sufficient compressed fluid to produce a decompressive spray, more preferably a decompressive spray with fine atomization. Preferably the liquid spray has a feathered spray pattern. Preferably the spray has a width that is greater than the spray pattern obtained when the water-borne coating composition is sprayed through the orifice under pressure with no compressed fluid admixed therewith.

Here too, when carbon dioxide is used as the compressed fluid with water-borne coating compositions that are sensitive to lowered pH level, particularly to acidic pH levels, preferably the pH is controlled or regulated sufficiently by the aforementioned methods, when the liquid mixture is formed, to avoid pH levels that cause stability problems for the water-borne coating composition, such as precipitation.

The aforementioned spray temperatures and pressures are also applicable. The liquid spray is preferably sprayed at a temperature and pressure at which the compressed fluid is a supercritical fluid.

As aforementioned, in order for the compressed fluid to form a liquid compressed fluid phase at temperatures and pressures at which it is a supercritical fluid, the water-borne coating composition preferably contains at least one organic solvent that is capable of being extracted from said water-borne coating composition into the compressed fluid phase. Then the compressed fluid phase comprises a liquid solution of compressed fluid and organic solvent when at pressures above the bubble point pressure for the liquid mixture. It is understood that only a portion of the organic solvent, generally only a small portion, need be extracted from the waterborne coating composition in order to form the liquid compressed fluid phase.

An organic solvent that is substantially insoluble in the water-borne coating composition may be added to the liquid mixture to enable the compressed fluid to form a liquid compressed fluid phase at supercritical conditions. This is desirable when the water-borne coating composition does not contain an extractable organic solvent or contains such solvent in insufficient quantity. It is particularly useful for spraying water-borne coating compositions containing water-dispersible polymers. Such insoluble organic solvents are typically hydrocarbon solvents such as pentane, hexane, heptane, octane, decane, toluene, xylene, and the like, including branched and aromatic hydrocarbons, but other insoluble solvents may also be used. The insoluble solvents preferably have a relatively high relative evaporation rate, preferably above about 100 (butyl acetate RER =100), such as pentane, hexane, and heptane, toluene, and the like, so that the solvent readily evaporates during spraying. The insoluble organic solvent must be at least partially miscible with the compressed fluid, preferably highly miscible with the compressed fluid when under pressure. The insoluble organic solvent should be used in a minimal amount that gives a sufficient amount of liquid compressed fluid phase for spraying, so as to minimize organic solvent emissions. Generally the amount of insoluble organic solvent will be between about 2 percent and about 25 percent of the total weight of water-borne coating composition and insoluble organic solvent, preferably between about 4 percent and about 20 percent, and more preferably between about 5 and about 15 percent.

Here too, forming and maintaining the finely dispersed liquid compressed fluid phase in the liquid mixture may be aided by using a dispersion, emulsifying, or stabilization agent for the compressed fluid as aforementioned. The aforementioned methods of admixing the solvent-borne coating composition and compressed fluid so as to form the finely dispersed liquid compressed fluid phase are also applicable here. When an insoluble organic solvent is utilized, it is preferably premixed with the water-borne coating composition so as to form a substantially finely dispersed insoluble organic solvent phase therein before admixing the water-borne coating composition with the compressed fluid.

Here too, an elongated orifice passageway with the characteristics aforementioned may be used to spray the liquid mixture.

Whereas the processes of the present invention have been described in terms of water-borne coating compositions capable of forming a coating on a substrate, it will be appreciated that the methods described herein may be applied to spraying water-borne polymeric compositions with reduced water content which are not coating compositions and wherein a coating is not deposited on a substrate. The water-borne polymeric compositions are preferably sprayed with the compressed fluid present at least in an amount which renders the liquid mixture capable of forming a decompressive spray. Here again, an elongated orifice passageway may be used to spray the liquid mixture as aforementioned.

While preferred forms of the present invention have been described, it should be apparent to those skilled in the art that methods and apparatus may be employed that are different from those shown without departing from the spirit and scope thereof.

EXAMPLE 1

A water-borne coating composition that gives a CARBOWAX® coating was prepared from Union Carbide CARBOWAX® Polyethylene Glycol 8000, which is a water-soluble solid polyethylene glycol polymer that has an average molecular weight of about 8000. The polymer was dissolved in water and methyl ethyl ketone solvent was added to give the following composition by weight: 45% polyethylene glycol polymer, 45% water, and 10% methyl ethyl ketone. The viscosity was about 235 centipoise at a temperature of 22° Celsius. The water-borne coating composition was sprayed using carbon dioxide as the compressed fluid. Methyl ethyl ketone is highly soluble in water and is highly miscible with carbon dioxide and therefore can be a coupling solvent for the carbon dioxide.

The liquid mixture of water-borne coating composition and compressed carbon dioxide fluid was prepared and sprayed in a batch mode by using the proportioning and spraying apparatus disclosed in FIG. 2 of U.S. Pat. No. 5,105,843. Carbon dioxide, supplied from a cylinder, was pressurized by a pump and regulated to the desired spray pressure by a pressure regulator. A mass flow meter measured the mass flow of carbon dioxide fed through a check valve to the mix point with the water-borne coating composition. The water-borne coating composition was supplied from a tank, pre-pressurized by a supply pump, and pressurized and metered by a precision gear pump. A gear meter measured the amount delivered through a check valve to the mix point with the carbon dioxide. The speed command of the gear pump was electronically controlled by an input signal from the mass flow meter by using a control system to automatically obtain the desired proportion of water-borne coating composition and carbon dioxide. The metering rate was electronically adjusted by a feedback signal from the gear meter to correct for pumping inefficiency. The liquid mixture of water-borne coating composition and carbon dioxide from the mix point was further mixed in a static mixer and admixed with recycled liquid mixture in a circulation loop. The circulation loop contained another static mixer, a flow-through piston-type accumulator, a heater, a filter, a high-pressure sight glass, a spray gun, a circulation pump, and a second heater. The spray gun was a Nordson UNICARB® SCF automatic airless spray gun with a Nordson UNICARB® SCF spray tip #123007 with UNICARB® SCF pre-orifice #138344. The spray tip had a 9-mil orifice size and a 10-inch fan width rating.

The circulation loop was filled with liquid mixture containing about 5 percent carbon dioxide by weight and continually circulated. The sight glass showed a relatively small amount of finely dispersed liquid carbon dioxide phase in the liquid mixture, which showed that the solubility was less than 5 percent. The carbon dioxide level was then increased to about 8 percent and sprayed at a temperature of 24° Celsius and a pressure of 900 psi. This produced an angular liquid-film spray having a visible liquid film and a fishtail spray pattern. The temperature and pressure were then increased to 43 ©Celsius and 1300 psi at the same carbon dioxide level and this also produced an angular liquid-film spray having a visible liquid film and a fishtail spray pattern having strong side jets. The pressure was further increased to 1550 psi, which still produced a liquid-film spray. The carbon dioxide level in the liquid mixture was then continuously increased while spraying, which caused the spray to transition from a liquid-film spray to a parabolic decompresslye spray having a feathered spray pattern and a greater fan width at the higher carbon dioxide level. The liquid carbon dioxide phase continued to remain finely and uniformly dispersed in the liquid mixture. At the temperature of 43° Celsius and pressure of 1550 psi, the decompressive spray had a narrow droplet size distribution having an average droplet size of 43.7 microns (Sauter Mean Diameter) and a span of 1.2, as measured using a Malvern TM type 2600 spray and droplet sizer. At constant carbon dioxide level and pressure, the spray temperature was increased to 50° Celsius, which produced a decompressive spray having a smaller average droplet size of 36.2 microns. The spray temperature was then further increased to 60° Celsius, which produced a decompressive spray having a still smaller average droplet size of 30.8 microns and a narrow span (distribution width) of 1.2. The liquid carbon dioxide phase continued to be finely and uniformly dispersed in the liquid mixture, which produced a steady uniform feathered spray pattern. A wood test panel, 12-inch by 12-inch in size, was then sprayed with the decompressive spray, which applied a very uniform CARBOWAX® coating having no sags or runs, due to the fine atomization and higher viscosity at which the coating was deposited because of the reduced water content with which it was sprayed. The carbon dioxide level in the liquid mixture was then further increased, which gave decompressive sprays having asymptotically smaller average droplet sizes of 26 microns and then 25 microns. The decompressive spray produced using no pre-orifice were substantially the same as those with the pre-orifice. Finally, at a high carbon dioxide level estimated to be between about 30 and 35 percent in the liquid mixture, the liquid carbon dioxide phase began to agglomerate and no longer remained finely dispersed, which caused the spray to begin to pulsate and to no longer be steady.

For comparison, a composition having 50% Polyethylene Glycol 8000 and 50% water by weight, but with no methyl ethyl ketone, was mixed with carbon dioxide in a high pressure cell at supercritical fluid conditions of 50° Celsius and 1600 psi. The carbon dioxide phase was a supercritical gas and not a liquid. This demonstrated that the methyl ethyl ketone was extracted from the water-borne coating composition by the carbon dioxide phase sufficiently to enable the carbon dioxide to form a liquid phase at the supercritical temperatures and pressures, even at very high levels of carbon dioxide. However, this did not adversely affect the coating.

For another comparison, the water-borne coating composition was sprayed by a conventional airless spray, with no carbon dioxide, but by using the same spray gun, spray tip, and pre-orifice and the same spray conditions of 50° and 60° Celsius temperature and about 1550 psi pressure. This produced angular liquid-film sprays having visible liquid films, very poor atomization, and a fishtail spray pattern having strong side jets. The fishtail sprays produced very nonuniform coatings on the wood test panels and the coatings were very poor, because the poor atomization produced many runs and sags.

For another comparison, the water-borne coating composition was sprayed using an air spray gun. This produced very poor uneven coatings with runs and sags due to very poor atomization. The water-borne coating composition was then diluted with water to a typical air spray viscosity of 78 centipoise at a temperature of 23° Celsius, which reduced the polymer level to 35.5% polymer and increased the water content to 56.6% water. The diluted composition was then sprayed with an air spray gun, which produced fine atomization but a broad droplet size distribution having a large span of 1.85. However, despite the fine atomization and a leathered spray, poor coatings were applied that were nonuniform, because the coatings were much wetter and less viscous due to the higher water content, which caused runs and sags even in relatively thinly applied coatings.

EXAMPLE 2

The water-borne coating composition was Joncryl® 540, which is a water-borne emulsion polymer system manufactured by S. C. Johnson Wax. It contains 44 weight percent water-dispersible solid acrylic polymer in water. It has a viscosity of 500 centipoise. The composition is water-reducible to obtain a low spray viscosity, but the composition was sprayed with no water dilution, and therefore had a reduced water content and high viscosity. The polymer dispersion is amine stabilized, that is, a portion of the polymer is converted to a dimethylethanol amine salt. The dispersion has a stable pH of about 8.5 and is sensitive to the pH being lowered to acidic levels. Carbon dioxide was found to be incompatible with the dispersion, without neutralization or buffering, as was demonstrated by adding carbon dioxide to the composition under pressure in a pressure cell. The reduction in pH caused the polymer to precipitate. However, ethane was compatible with the composition because ethane did not affect the pH.

Because the water-borne coating composition contained no coupling agent for ethane and no extractable solvent, hexane was dispersed into the water-borne coating composition to give a mixture containing 10 percent hexane by weight. Hexane is insoluble in the water-borne coating composition but it is highly miscible with ethane when under pressure, thereby enabling the ethane to form a liquid phase at supercritical temperature and pressure, when above the bubble point pressure of the mixture. It has a high relative evaporation rate of about 1150.

The mixture of water-borne coating composition and hexane was sprayed in a batch mode by using the same spray apparatus, spray gun, and spray tip as in Example 1. The circulation loop was filled with a liquid mixture of the water-borne coating composition, hexane, and 6 percent ethane by weight at a pressure of 1600 psi and a temperature of 50° Celsius. The liquid mixture was continually circulated and contained a finely dispersed liquid ethane phase at the supercritical temperature and pressure. This produced an angular liquid-film spray having a visible liquid film. Increasing the temperature to 55° Celsius and the ethane level to 8 weight percent gave an angular liquid film spray having no visible liquid film, which indicated that the spray was close to the transition to a decompressive spray. Increasing the ethane level to 10 weight percent gave a finely dispersed liquid ethane phase which produced a parabolic decompressive spray that was still close to the transition from a liquid-film spray. Increasing the ethane level to 16 weight percent gave a uniform feathered decompressive spray having finer droplet size, both with and without the pre-orifice. Increasing the spray temperature to 60° Celsius and the ethane level to a higher level of 20 weight percent continued to give a finely dispersed liquid ethane phase in the liquid mixture, which produced a feathered decompressive spray having an average droplet size of 56 microns. The water-borne coating composition was then sprayed onto a wood test panel, which deposited the material very uniformly and with a high viscosity by virtue of the reduced water content that prevents runs and sags.

For comparison, the water-borne coating composition was diluted with water to an air spray viscosity of 72 centipoise at a temperature of 23° Celsius. The diluted water-borne coating composition was sprayed by using an air spray gun, which produced poor coatings despite fine atomization because the very wet coating had low viscosity, which caused the wet coating to run and sag before it air dried to a hard coating.

What is claimed is:

1. A process for spraying a water-borne polymeric composition having reduced water content, which comprises:
   (1) forming a liquid mixture in a closed system, said liquid mixture containing a water-borne polymeric composition and a compressed fluid comprising:
      (a) a water-borne polymeric composition containing a solvent fraction having at least about 35 percent water by weight and containing at least one coupling agent for the compressed fluid; and
      (b) at least one compressed fluid which is compatible with said water-borne polymeric composition and which is at least in an amount which renders said liquid mixture capable of being sprayed, wherein the compressed fluid is a gas at standard conditions of 0° C. and one atmosphere pressure (STP); and
   (2) spraying said liquid mixture by passing the mixture under pressure through an orifice to form a liquid spray which comprises a decompressive spray or a transition spray.

2. The process of claim 1, wherein said water-borne polymeric composition is a water-borne coating composition that contains at least one polymer capable of forming a coating on a substrate.

3. The process of claim 2, wherein said at least one polymer is a water-dispersible polymer or a water-soluble polymer.

4. The process of claim 1, wherein said at least one coupling agent for said compressed fluid comprises a coupling solvent or a coupling polymer.

5. The process of claim 1, wherein said at least one compressed fluid is selected from the group consisting of carbon dioxide, nitrous oxide, ethane, ethylene, propane, propylene, butane, and isobutane.

6. The process of claim 5, wherein the compressed fluid is carbon dioxide and the pH of said liquid mixture is controlled to prevent polymer precipitation when admixing said carbon dioxide with said water-borne polymeric composition.

7. The method of claim 1, wherein said liquid spray comprises a decompressive spray.

8. The process of claim 1, wherein said liquid mixture contains a finely dispersed liquid compressed fluid phase.

9. The process of claim 8, wherein said water-borne polymeric composition contains at least one organic solvent that is capable of being extracted from said water-borne polymeric composition into the compressed fluid phase.

10. The method of claim 1, wherein the ratio of the length of said orifice to its equivalent diameter is in the range of from about 2 to about 20.

11. A process for spraying a water-borne polymeric composition having reduced water content, which comprises:
   (1) forming a liquid mixture in a closed system, said liquid mixture containing a water-borne polymeric composition and a compressed fluid comprising:
      (a) a water-borne polymeric composition containing a solvent fraction having at least about 35 percent water by weight; and
      (b) at least one compressed fluid which is compatible with or can be made compatible with said water-borne polymeric composition; which is present in said liquid mixture as a finely dispersed liquid compressed fluid phase; and which is at least in an amount which renders said liquid mixture capable of being sprayed, wherein the compressed fluid is a gas at standard conditions of 0° C. and one atmosphere pressure (STP); and
   (2) spraying said liquid mixture by passing the mixture under pressure through an orifice to form a liquid spray which comprises a decompressive spray or a transition spray.

12. The process of claim 11, wherein said water-borne polymeric composition is a water-borne coating composition that contains at least one polymer capable of forming a coating on a substrate.

13. The process of claim 12, wherein said at least one polymer is a water-dispersible polymer or a water-soluble polymer.

14. The process of claim 11 wherein said at least one compressed fluid is a supercritical fluid at the temperature and pressure at which said liquid mixture is sprayed and said water-borne polymeric composition contains at least one organic solvent that is capable of being extracted from said water-borne polymeric composition into the compressed fluid, thereby enabling said compressed fluid to form the liquid compressed fluid phase at the supercritical temperature and pressure.

15. The process of claim 11, wherein said at least one compressed fluid is a supercritical fluid at the temperature and pressure at which said liquid mixture is sprayed and said liquid mixture contains in addition at least one organic solvent (c) which is immiscible with said water-borne polymeric composition; which is at least partially miscible with said at least one compressed fluid under pressure; and which is present at least in an amount which enables said compressed fluid to form the liquid compressed fluid phase at the supercritical temperature and pressure.

16. The process of claim 11, wherein said at least one compressed fluid is selected from the group consisting of carbon dioxide, nitrous oxide, ethane, ethylene, propane, propylene, butane, and isobutane.

17. The process of claim 16 wherein the compressed fluid is carbon dioxide and the pH of said liquid mixture is controlled to prevent polymer precipitation when admixing said carbon dioxide with said water-borne polymeric composition.

18. The method of claim 11, wherein said liquid spray comprises a decompressive spray.

19. A process for spraying a water-borne coating composition having reduced water content, which comprises:
   (1) forming a liquid mixture in a closed system, said liquid mixture containing a water-borne coating composition and a compressed fluid comprising:
      (a) a water-borne coating composition containing a solvent fraction having at least about 35 percent water by weight and containing at least one coupling agent for the compressed fluid; and
      (b) at least one compressed fluid which is compatible with or can be made compatible with said water-borne coating composition and which is at least in an amount which renders said liquid mixture capable of being sprayed, wherein the compressed fluid is a gas at standard conditions of 0° C. and one atmosphere pressure (STP); and
   (2) spraying said liquid mixture by passing the mixture under pressure through an orifice to form a liquid spray Which comprises a decompressive spray or a transition spray.

20. A process for spraying a water-borne coating composition having reduced water content, which comprises:
   (1) forming a liquid mixture in a closed system, said liquid mixture containing a water-borne coating composition and a compressed fluid comprising:
      (a) a water-borne coating composition containing a solvent fraction having at least about 35 percent water by weight; and
      (b) at least one compressed fluid which is compatible with or can be made compatible with said water-borne coating composition; which is present in said liquid mixture as a timely dispersed liquid compressed fluid phase; and which is at least in an amount which renders said liquid mixture capable of being sprayed, wherein the compressed fluid is a gas at standard conditions of 0° C. and one atmosphere pressure (STP); and
   (2) spraying said liquid mixture by passing the mixture under pressure through an orifice to form a liquid spray which comprises a decompressive spray or a transition spray.

* * * * *

UNITED STATES PATENT AND TRADEMARK OFFICE
CERTIFICATE OF CORRECTION

PATENT NO. : 5,419,487
DATED : May 30, 1995
INVENTOR(S) : Kenneth A. Nielsen, David C. Busby, Charles W. Glancy
and Gregory C. Ross It is certified that error appears in the above-identified patent and that said Letters Patent is hereby corrected as shown below:

Column 28:

Claim 20, line 15 "timely" should read --finely--.

Signed and Sealed this

Fifteenth Day of August, 1995

Attest:

BRUCE LEHMAN

Attesting Officer

Commissioner of Patents and Trademarks